Nov. 1, 1927.
D. D. CUSHMAN
1,647,344
OIL SEPARATOR
Filed April 4, 1927
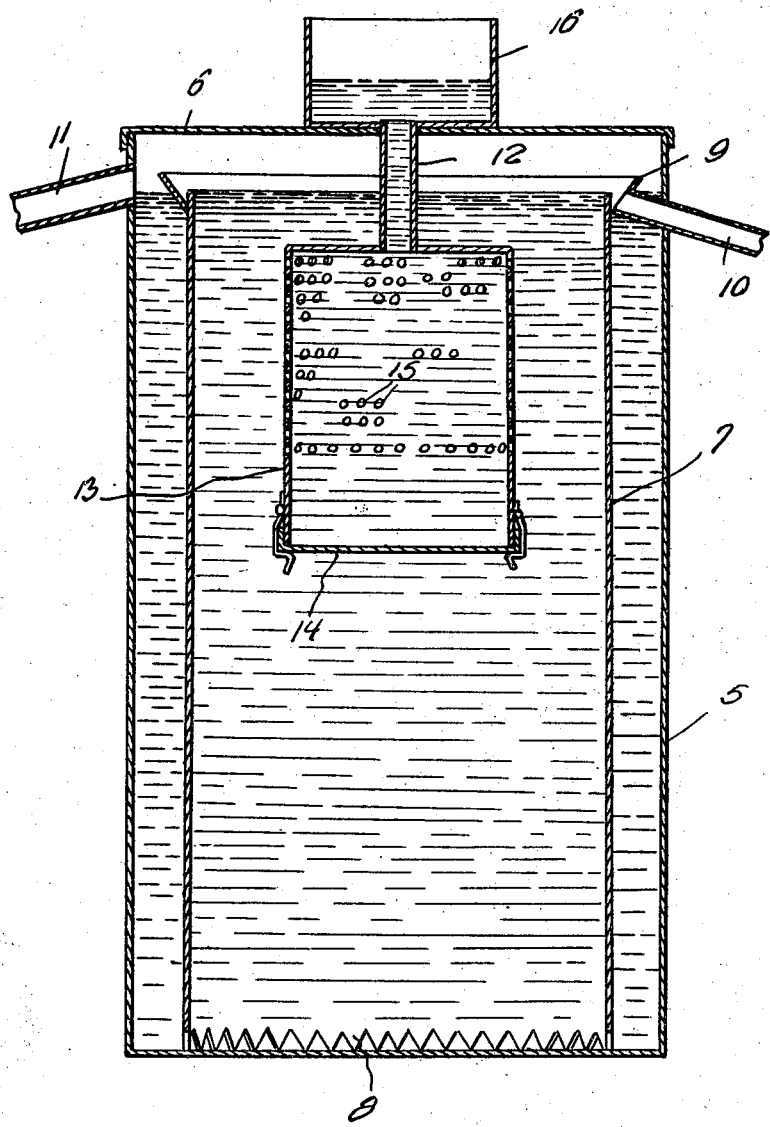
Inventor
D. D. Cushman
By *Clarence A. O'Brien*
Attorney Patented Nov. 1, 1927.

1,647,344

UNITED STATES PATENT OFFICE.

DAVID DUES CUSHMAN, OF WICHITA FALLS, TEXAS.

OIL SEPARATOR.

Application filed April 4, 1927. Serial No. 180,844.

This invention relates to new and useful improvements in liquid separators and has more particular reference to a means for facilitating the proper separation of water and basic settlement from crude oil or petroleum, and this as the oil flows directly from the well and without causing any interruption in the flow thereof.

In carrying out my invention, there is provided a highly novel, simple and inexpensive device, for receiving the oil from the well and so constructed as to cause the positive separation of the water and solid matter that may be found therein.

In the drawings, the figure is a detail longitudinal section through my improved separator.

Now having particular reference to the drawing, the device consists of a tank 5, of predetermined capacity open at its upper end and being equipped at said upper end with a removable lid 6. Arranged within this tank 5 is a cylinder 7 open at its opposite ends, the lower end thereof resting upon the bottom wall of the tank and being scalloped as at 8, to provide a plurality of passageways between the cylinder and said tank. As clearly disclosed in the drawing, the upper end of this cylinder 7 terminates within the upper end of the tank, while said upper end of the cylinder is provided with a concentric conical trough 9, the upper edge of which extends slightly beyond the upper edge of the cylinder and from which extends a discharge pipe 10 arranged through an opening in the tank 5, said tank being equipped adjacent its upper end with a discharge pipe 11.

Arranged through an opening in the center of the tank lid 5 is the upper end of a short vertical pipe 12, that has communication at its lower end with a cylinder 13, open at its lower end and provided at said end with a removable lid 14. This cylinder 13 is formed at a point beginning slightly beyond the lower end thereof with outlet openings 15.

Arranged upon the lid 5 is an oil receiving trough 16, having communication with the pipe 12, so that the oil therefrom may flow into the cylinder 13.

Obviously, as the oil flows into said cylinder 13, solid particles will sink to the bottom thereof while the fluid will pass into the cylinder 7 through the openings 15 in the internal cylinder 13. The oil will rise to the top of this cylinder 7 and flow over the edge thereof into the top 9, from whence it will flow through the pipe 10. The water will flow downwardly within the cylinder 7 through the passages in the lower end thereof after which said water will enter the main tank 5, and when reaching the discharge pipe 11 will flow therefrom.

It will thus be seen that I have provided a highly novel, simple and extremely inexpensive oil separator that is well adapted for all of the purposes heretofore designated, and even though I have shown and described the invention as consisting of certain detail structural elements, it is nevertheless to be understood that some changes may be made therein without affecting the spirit and scope of the appended claims.

Having thus described my invention, what I claim as new is:

1. In a separator of the character described, a tank, a lid upon the upper end of the tank, an open ended cylinder arranged concentrically within the tank and having openings at its lower end, an oil channel at the upper end of the cylinder to receive the oil flowing over the edge thereof, a discharge for said oil, a second cylinder arranged within the upper end of the first cylinder and at a point slightly beneath the upper end of said first cylinder, said second cylinder being closed at its lower end and being formed with discharge openings at a point above the closed end thereof, and means extending through the tank lid to allow the material to be separated to be injected into the second cylinder.

2. In a separator of the character described, a tank, a lid upon the upper end of the tank, an open ended cylinder arranged concentrically within the tank, and having openings at its lower end, an oil channel at the upper end of the cylinder to receive the oil flowing over the edge thereof, a discharge for said oil, a second cylinder arranged within the upper end of the first cylinder and at a point slightly beneath the upper end of said first cylinder, said second cylinder being closed at its lower end and being formed with discharge openings at a point above the closed end thereof, and means extending through the tank lid to allow the material to be separated to be injected into the second cylinder, said means consisting of a pipe extending vertically from the second cylinder through an opening in the tank lid, and a material receiving trough arranged upon the upper end of said pipe.

3. In a separator of the character described, a tank, a lid upon the upper end of the tank, an open ended cylinder arranged in the tank and having openings at its lower ends to permit the heavier material sinking therein to pass into the tank, an oil channel at the upper end of the cylinder to receive the lighter material, such as the oil that rises within the cylinder and that flows over the upper end thereof, and a discharge for said oil, a second cylinder arranged within the upper end of the first cylinder, and closed at its opposite ends, a removable lid for the lower end of said second cylinder, said cylinder being formed with discharge openings at a point above the lid at the bottom thereof, and means extending to the tank lid to allow the material to be injected into said second cylinder.

In testimony whereof I affix my signature.

DAVID DUES CUSHMAN.